(12) United States Patent
Lukianov

(10) Patent No.: US 12,345,603 B1
(45) Date of Patent: Jul. 1, 2025

(54) MOBILE TIRE TESTING APPARATUS

(71) Applicant: Eugene R. Lukianov, Cushing, ME (US)

(72) Inventor: Eugene R. Lukianov, Cushing, ME (US)

(73) Assignee: Eugene R. Lukianov, Cushing, ME (US)

( * ) Notice: Subject to any disclaimer, the term of this patent is extended or adjusted under 35 U.S.C. 154(b) by 0 days.

(21) Appl. No.: 18/822,768

(22) Filed: Sep. 3, 2024

(51) Int. Cl.
*G01M 17/02* (2006.01)

(52) U.S. Cl.
CPC .................................. *G01M 17/02* (2013.01)

(58) Field of Classification Search
CPC ............................ G01M 17/02; G01M 17/021
USPC ...................................................... 73/9, 146
See application file for complete search history.

(56) References Cited

U.S. PATENT DOCUMENTS

| | | | |
|---|---|---|---|
| 3,948,080 A | 4/1976 | Boyd | |
| 4,953,392 A * | 9/1990 | Barson | G01M 17/022 73/146 |
| 6,446,501 B1 * | 9/2002 | Domeck | G01M 17/007 73/146 |
| 7,552,629 B2 | 6/2009 | Regis et al. | |
| 9,038,449 B2 * | 5/2015 | Cuttino | G01M 17/021 73/146 |
| 2009/0240399 A1 * | 9/2009 | Dagenais | B62K 5/05 701/42 |
| 2011/0000292 A1 | 1/2011 | Yoshikawa et al. | |

FOREIGN PATENT DOCUMENTS

| | | |
|---|---|---|
| CN | 112881038 A | 6/2021 |
| JP | 4671973 B2 | 4/2011 |

* cited by examiner

*Primary Examiner* — Kristina M Deherrera
*Assistant Examiner* — Gedeon M Kidanu
(74) *Attorney, Agent, or Firm* — Carrier, Shende & Associates P.C.; Joseph P. Carrier; Fulchand P. Shende

(57) ABSTRACT

A mobile tire testing apparatus including a chassis, three wheel-mounted tires respectively attached to the chassis in a triangular arrangement at three corner positions of the apparatus, wherein two of the wheel-mounted tires are provided at opposite lateral sides at one end portion of the chassis and the third wheel-mounted tire provided centrally in a width direction at the opposite end portion of the chassis, a propulsion device operatively connected to drive at least one of the wheel-mounted tires, a steering mechanism operatively connected to steer at least two of the wheel-mounted tires, a braking system operatively connected to brake each of the three wheel-mounted tires, and a force and moment sensor provided in operative association with at least the third wheel-mounted tire and configured to detect forces and moments acting on at least the third wheel-mounted tire.

14 Claims, 10 Drawing Sheets

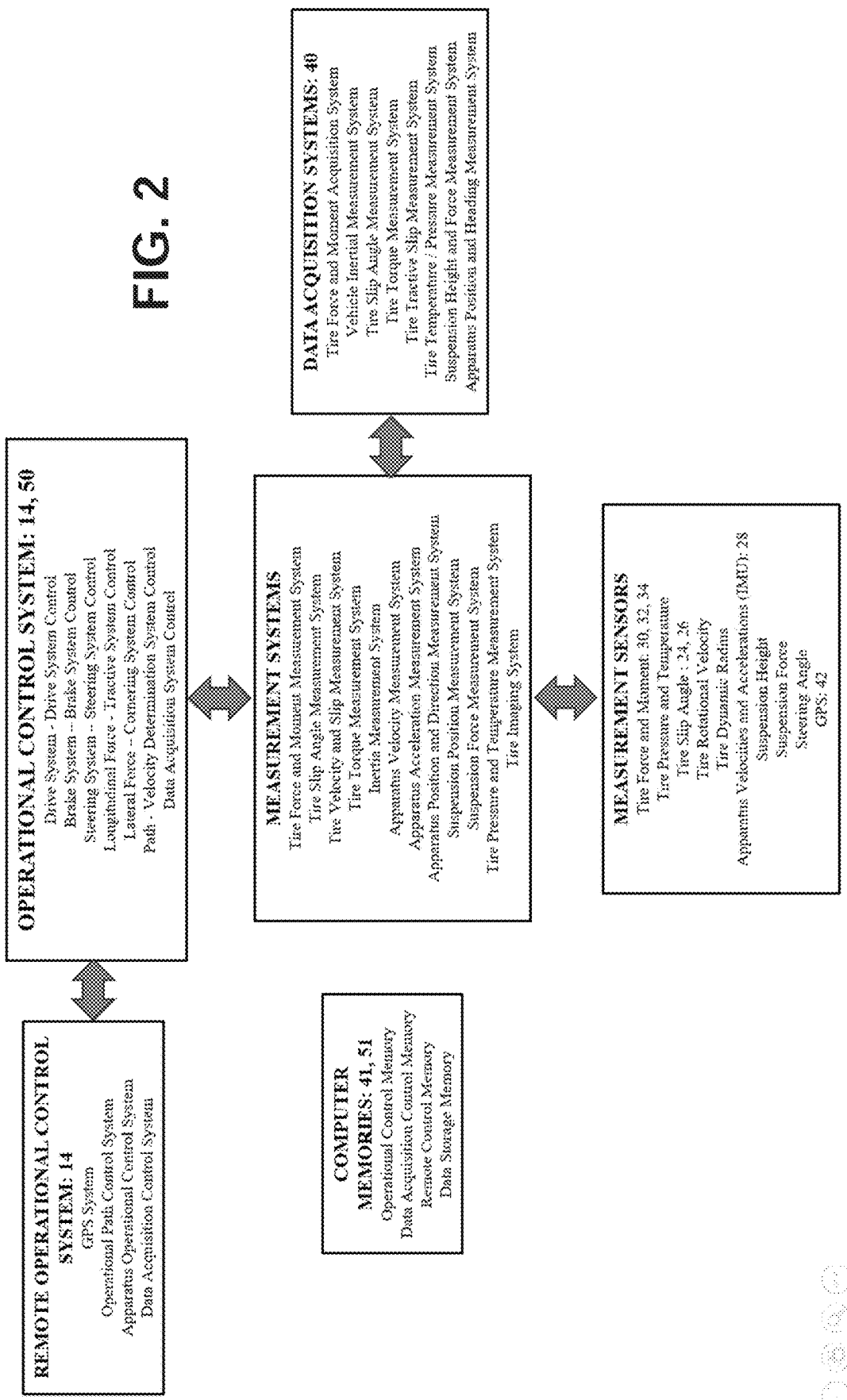

RAL + FAL = W
RAL x (a+b) − W x a = 0
W − RAL = FAL

RAL + FAL = W
RAL x (a+b) − W x a = 0
W − RAL = FAL

LtAL + RtAL = W
LtAL x t − W x c = 0
(c = ½ t)
W − LtAL = RtAL

LtFAL + RtFAL + RAL = W
(RAL is known from the previous step)
LtFAL x t + RAL x c − W x c = 0
(c = ½ t)
W − LtFAL − RAL = RtFAL

FIG. 3C

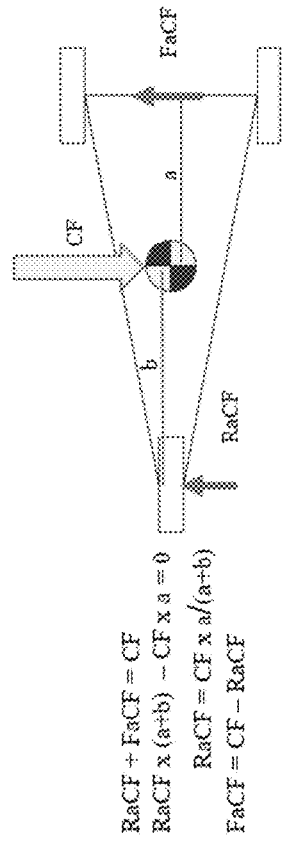

$LtAL + RtAL = W$
$LtAL \times t - W \times c - CF \times h = 0$
$(c = \frac{1}{2} t)$
$TCF + CF = 0$
$W - LtAL = RtAL$

FIG. 4C

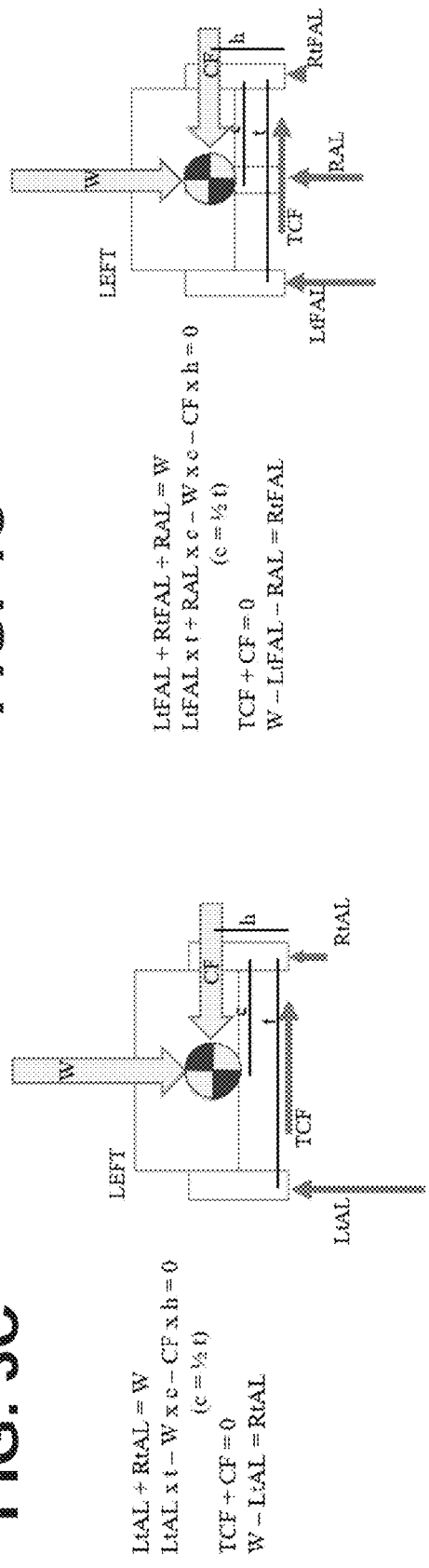

$LtFAL + RtFAL + RAL = W$
$LtFAL \times t + RAL \times c - W \times c - CF \times h = 0$
$(c = \frac{1}{2} t)$
$TCF + CF = 0$
$W - LtFAL - RAL = RtFAL$

FIG. 3D

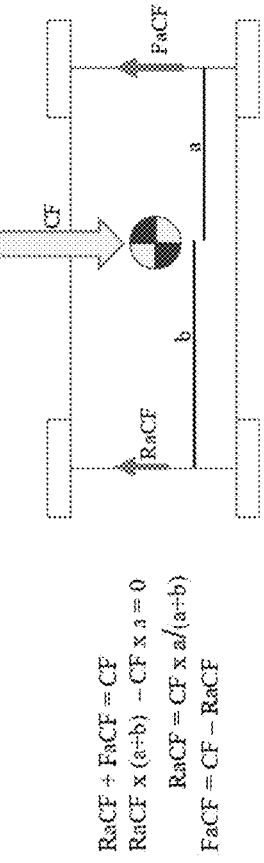

$RaCF + FaCF = CF$
$RaCF \times (a+b) - CF \times a = 0$
$RaCF = CF \times a/(a+b)$
$FaCF = CF - RaCF$

FIG. 4D $RaCF + FaCF = CF$
$RaCF \times (a+b) - CF \times a = 0$
$RaCF = CF \times a/(a+b)$
$FaCF = CF - RaCF$

MOBILE TIRE TESTING APPARATUS

BACKGROUND OF THE INVENTION

1. Field of the Invention

The present invention relates to an improved, novel, mobile tire testing apparatus which has testing capabilities that go beyond the testing capabilities of conventional tire testing apparatus, which may be categorized as simulated testing apparatus which test tires under simulated conditions and mobile testing apparatus which test tires while the apparatus travels along road surfaces and the tires are subjected to the test conditions. More particularly, the present invention provides such improved mobile tire testing apparatus in which the tested tire supports and can drive the mobile testing apparatus as it travels along paved and unpaved surfaces while fully testing the operational characteristics of the tires. This testing apparatus can be steered, braked and operated to the full extent of any conventional vehicle, while also controlling vertical loading, such that the apparatus is capable of exercising a tire and acquiring longitudinal and lateral tire force and moment data throughout the tire's full operational envelope on any surface and under any weather condition which the tires may experience in actual use, including up to full side slip saturation of 90 degrees. In other words, the testing apparatus according to the present invention can permit a tire be fully subjected to a greatly increased range of force and moment testing conditions, including extreme, real on road and off road conditions which are not achievable using the conventional tire testing apparatus, thereby permitting more complete tire testing information to be acquired than is possible with conventional tire testing apparatus. Additionally, testing data obtained using the testing apparatus of the present invention are more thoroughly and completely evaluated than testing data obtained using the conventional tire testing apparatus.

2. Description of the Background Art

Tire supported vehicles are highly commonplace and have been so for more than 100 years. Correspondingly, there are many known tire testing apparatus which test various characteristics of the tires, including force and moment characteristics under various operating conditions. The force and moment testing protocols can be divided into two categories. i.e., tractive testing which quantifies longitudinal tractive and braking forces and moments, and lateral force testing which quantifies tire slip angle and cornering forces and moments as the tire is steered, but which may also involve tractive and braking forces present in addition to cornering forces.

The known tire testing apparatus may be generally categorized as simulated tire testing apparatus which test tires under simulated conditions not involving actual road travel and mobile tire testing apparatus which test tires while the apparatus travels along road surfaces and the tires are subjected to the testing conditions. Each type of the known tire testing apparatus typically includes a system that monitors various characteristics of the tire being tested as the tire is disposed in various different orientations relative to different axes/directions, and other conditions under which the tire is operated are changed, including loads applied to the tire, velocities, lateral accelerations, rolling speeds, tire pressure, etc. One sensor conventionally used in the conventional tire testing is a multi-component, e.g., six (6) component, wheel force transducer sensor which measures forces and moments applied to the test tire and typically measures longitudinal and/or lateral forces and moments of the tested tire as the vehicle travels along a road surface. Whether simulated or mobile, the known tire testing apparatus has significant limitations associated therewith based on the configurations of the conventional testing apparatus.

The conventional simulated testing apparatus generally include some type of testing surface against which a single, suspended, wheel-mounted tire engages and a system for supporting the suspended, wheel-mounted tire while the testing surface and/or the wheel-mounted tire are moved relative to each other in rolling movement and various characteristics of the tire are monitored as the tire is disposed in various different orientations relative to different axes/directions, and other conditions under which the tire is operated are changed, including loads, forces and moments applied to the tire, rolling speeds, etc. The known simulated testing apparatus may be conveniently disposed in many places, including places where ambient conditions are controlled. However, for such simulated testing apparatus there are several limitations, most significant of which is the challenge of simulating real operating conditions that the tires will experience throughout the entire range of actual use, which is not possible as a practical matter.

The conventional mobile tire testing apparatus generally include some type of movable chassis structure that can travel along road surfaces, which chassis may be a towable trailer type structure without its own driving force, some type of chassis structure supported by additional wheel-mounted tires, which has its own driving, braking and steering systems for traveling along road surfaces, and a system for supporting and manipulating a single, suspended, wheel-mounted tire that is being tested, which is not one of the wheel-mounted tires supporting the chassis, or a conventional four wheeled vehicle which has been equipped with various additional sensors and instrumentation that monitor one or more of the vehicle's wheel-mounted tires for force and moment characteristics as the vehicle travels.

The conventional mobile tire testing apparatus other than a conventional four wheeled vehicle apparatus will generally include at least two coaxial pairs of wheel-mounted tires spaced apart from each other on the apparatus, wherein the tires of each pair are spaced from each other in a lateral direction of a chassis of the apparatus, and all of which wheel-mounted tires support the apparatus to travel along road surfaces. Such known mobile tire testing apparatus may also include a system for supporting and manipulating a single, suspended, wheel-mounted tire that is being tested such that the tested tire is disposed longitudinally away from the pair(s) of the supporting wheel-mounted tires and laterally between the tires of each pair so that the tested tire is minimally affected by tracks which the supporting, wheel-mounted tires leave in the road surfaces. In such conventional mobile testing apparatus the tested tire is typically not used to drive the movable chassis or trailer structure, although the mobile testing apparatus may include suspensions for the wheel-mounted tires being tested, as well as controls and mechanisms to simulate that the tested tire is supporting and/or driving a vehicle. Many of such mobile tire testing apparatus tend to be relatively large and complex. See, for example, those disclosed in U.S. Pat. No. 3,948,080, US Patent Application Publication 2011/0000292, Chinese Published Application 112881038, and Japanese Patent No. 4671973.

Based on the configurations of the conventional testing apparatus, conventional tire testing mostly involves cornering testing and tractive testing, and these are done separately.

Cornering testing is mostly performed using simulated testing apparatus including a flat belt which simulates pavement and is moved at different speeds, for testing under dry conditions. The cornering is typically limited to angular steering movements left and right up to approximately 15° from straight ahead. Tractive testing involves longitudinal movements of the tested tire as the apparatus moves straight while applying a driving or braking force along a road surface, which is typically a paved road that may be wet, dry, icy, etc., and the tire may be rolling, slipping and skidding.

The known mobile tire testing apparatus involving conventional four wheeled vehicles may be a car or truck type vehicle, and may have some similarity to a tire testing apparatus according to the present invention. However, such known testing apparatus involving conventional four wheeled vehicles still have many drawbacks as a tire testing apparatus, e.g., they are inherently limited as tire testing apparatus based on physical limitations and the dynamics of four wheeled vehicle support, and correspondingly may be considered poor tire testing apparatus. Some inherent limitations of the conventional four wheeled vehicles as tire testing apparatus including the following.

Vertical Loading The vertical forces supporting the individual tires of a four wheeled vehicle are not directly related to the overall state of the vehicle's performance. The four wheeled vehicle has interactions between the vertical forces at the four tires as weight is transferred laterally due to cornering. For example, the lateral weight transfer distribution between the front and rear tires of a four wheeled vehicle depends upon the roll stiffness distribution of the front and rear suspensions, such that the stiffer the front suspension is relative to the rear suspension, the greater the proportion of weight transfer that will occur at the front tires. See W. Milliken et al., *Race Car Vehicle Dynamics* (1994).

Traveling Surface Consistency Surface elevation unevenness under the tires of a four wheel vehicle results in 'cross talk' between the vertical forces at the four tires. As one tire is raised because of surface elevation, increasing the load on that tire, the vertical load of the two adjacent tires is equally reduced and the load on the diagonally opposite tire is equally increased.

Both of the above situations occur constantly as a four wheel vehicle moves, resulting in a continuous redistribution of vertical forces between the four tires. These continuous changes in tire vertical forces inherent in a four wheel vehicle operation make it impossible to maintain steady, predictable and controllable vertical tire forces necessary for tire force and moment measurements. Although four vertical tire forces and four tire cornering forces need to be measured with such testing apparatus, the four wheel vehicle does not allow any of the eight forces to be resolved from global performance measurements of the vehicle itself.

Cornering Force Distribution Tire cornering forces depend upon the vertical and longitudinal forces that the tire is experiencing, steering angles and tire slip angles inherent tire characteristics and 'road' surface friction characteristics. If two tires are oriented as a pair of tires at the front or rear of a vehicle, it is impossible to determine an individual tire's performance characteristics from global vehicle performance measurements. Direct force and moment measurement of the wheels and tires in question is therefore necessary. As a result, measurement of a four wheel vehicle performance, having two pairs of tires cannot provide individual tire performance information. Given direct instrumented measurement of the four tires' performance under the four wheeled vehicle, the previous issues of interaction, 'cross talk' and unstable vertical forces come into play and confound the tire data acquired. Based on these limitations, a four wheel vehicle may be considered a poor tire testing machine.

Current conventional, mobile tire testing platforms are limited by their very nature as to the range of weather and surfaces on which they may operate. Mobile tire testing apparatus that are based upon towed trailers are limited to the performance possible of the towing vehicle and towed trailer. Mobile gantry tire testing apparatus are limited to the possible range of travel and by the necessity of preparing a specialized test surface under the gantry.

While the known tire testing apparatus are suitable for their intended functions and have been used for many years, they are limited in the range of testing and operating conditions they are capable of operating in and they still remain to be improved upon in terms of range of testing capabilities, and in terms of ease of use, size, complexity and cost. Hence, there remains room for improvement and there remains a need in the art for an improved tire testing apparatus which can more fully test characteristics of tires and provide testing data that can be readily analyzed in relation to a single tire's characteristics, while also minimizing the size, complexity and cost of the apparatus.

SUMMARY OF THE PRESENT INVENTION

It is an object of the invention to provide an improved mobile tire testing apparatus which satisfies the above discussed need.

The present inventor has carefully studied the conventional tire testing apparatus and how these apparatus are limited in their testing capabilities based the practical limits inherent to their designs, and based on such studies has determined that many of the limitations of the conventional testing apparatus can be overcome or avoided using a three wheeled, self-propelled mobile tire testing apparatus. In such apparatus the three wheels may be arranged triangularly with one of the wheels disposed at a central lateral position at one end of the apparatus and the other two wheels disposed spaced from each other on a common axis at the opposite end of the apparatus, and the characteristics of one or more of the tires provided on the three wheels are monitored as the apparatus is operated by travelling under essentially unlimited on-road and off-road conditions.

In such three wheeled testing apparatus, any or all three wheels may be driven, free rolling or braked. The steering may be accomplished using the two tires disposed coaxially at one end of the apparatus and/or by the single tire at the one end of the vehicle. The force and moment characteristics of any or all of the three wheel-mounted tires may be tested and monitored while the movable, self-propelled tire testing apparatus travels under essentially unlimited on-road and off-road conditions. However, based on the unique three wheeled configuration of the testing apparatus, the third, single tire at one end portion of the apparatus, is uniquely positioned so that it can be subjected to wider and more complete testing parameters. Also, its characteristics can be directly determined from global performance measurements of the entire apparatus, as well as though use of conventional tire testing sensors provided in relation to the individual tire being tested, such as force and moment sensors. For conventional four wheeled tire testing apparatus, it is not possible to determine a tire's characteristics directly from global performance measurements of the entire apparatus, so that use of sensors provided in relation to the individual tire being tested is necessary.

The inventor has determined that the three-wheeled testing apparatus can greatly and advantageously expand the cornering and tractive testing done by the conventional tire testing apparatus. While the cornering testing is typically limited to angular movements left and right up to 15° from straight ahead and on dry pavement conditions with the conventional testing apparatus, for the three wheeled testing apparatus according to the present invention cornering testing can be performed on essentially any paved or unpaved surface, whether wet, dry or icy, and the three wheeled apparatus can be steered to develop tire slip angles exceeding 15° from straight ahead in right and left directions. Furthermore, the apparatus can achieve tire slip angles greater than 15° that even allow the apparatus to "spin out" and thereby saturating the cornering potential of a tire being tested to 90° tire slip angle.

In terms of tractive testing, involving longitudinal movements of the tested tire as the apparatus moves straight along a road surface, for the conventional testing apparatus such testing is typically performed on a paved road, which may be wet, dry, icy, etc., and the tire may be rolling, slipping and skidding. For the three wheeled testing apparatus according to the present invention, tractive testing may be performed on any road or off road surface, including rocks, gravel, sand, snow and ice, and under any weather conditions. When located at the rear of the apparatus, the centrally located, single tire is positioned to travel over surfaces and terrain that is undisturbed by the other two tires at the front of the apparatus, thereby allowing measurement of tire performance over undisturbed surfaces and terrain.

The three-wheeled testing apparatus according to the present invention can test the tires longitudinal tractive and braking characteristics and lateral cornering characteristics up to full saturation, as well as test the tires in combined longitudinal and lateral test scenarios up to full saturation.

Further, while the cornering and tractive tire testing is generally performed separately with the conventional testing apparatus, the three wheeled testing apparatus according to the present invention can perform the cornering and tractive testing separately or simultaneously. This leads to greater efficiency, more comprehensive tire performance data and cost reduction for the testing performed by the three wheeled testing apparatus, and better corresponds to actual use the tested tires will experience in real life applications where vehicle tires are simultaneously often subjected to both cornering and tractive movements of the vehicles on which they are disposed.

The inventor has also determined that the interaction and 'cross talk' that is present in a four wheel tire testing apparatus due to lateral weight transfer and surface unevenness does not occur in the three wheeled tire testing apparatus' triangular configuration according to the present invention, in which three wheel mounted tires are provided respectively at the three corners of the apparatus. Correspondingly, the three wheeled apparatus' performance measurements relating to its tires are stable compared to the measurements of a four wheeled testing apparatus, and can be used to predict and control the vertical forces required for cornering force and moment measurements when testing tires. Also, a three wheeled apparatus, having a single tire at one end, allows the entire apparatus' performance measurements to be used directly to quantify that single tire's performance characteristics. The opposite end of such three wheeled apparatus having a pair of laterally spaced tires will also have inherently stable vertical force control that allows for individual tire force and moment measurements. For example, given that three vertical tire forces and three tire cornering forces need to be measured for such a three wheeled apparatus, the positioning of the tires on the three wheel apparatus allows four of the six forces to be advantageously resolved directly from global vehicle performance measurements. This is particularly advantageous in comparison to the four wheeled testing apparatus wherein none of the four vertical tire forces and four tire cornering forces that need to be obtained can be resolved directly from global performance measurements of the entire apparatus.

According to an aspect and embodiment of the present invention there is provided a mobile tire testing apparatus which comprises: a chassis; three wheel-mounted tires attached to the chassis in a triangular arrangement at three corner positions of the chassis, wherein two of the wheel-mounted tires are provided at opposite lateral sides at one end portion of the chassis and the third wheel-mounted tire provided centrally in a width direction at the opposite end portion of the chassis; a propulsion device operatively connected to drive at least one of the wheel-mounted tires; a steering mechanism operatively connected to steer at least one of the wheel-mounted tires; a braking system operatively connected to brake each of the three wheel-mounted tires; and a force and moment sensor provided in operative association with at least the third wheel-mounted tire and configured to detect forces and moments acting on at least the third wheel-mounted tire while the apparatus is operated.

Such mobile tire testing apparatus according to the first aspect and embodiment of the present invention may further comprise: a body attached to the chassis and defining an interior space for accommodating one or more passengers; sensors for detecting dynamic motions of the tires and apparatus, including positions, velocities, lateral, longitudinal and vertical accelerations, pitch, roll and yaw angles and rate, and tire slip angles; a data acquisition system for acquiring data from the force and moment sensor and the sensors for detecting dynamic positions and motions of the apparatus; and one or more controllers which receive outputs of the force and moment sensor and the sensors for detecting dynamic motions of the apparatus, and which are programmed to control operations of the apparatus.

The one or more controllers may automatically control some operations of the apparatus based on sensed conditions of the apparatus and its surrounding, e.g., braking, steering, velocity and accelerations, although a passenger disposed with the vehicle may also be permitted to selectively, manually control some or all of such operations using manual controls provided with the apparatus. Further, the one or more controllers may control and adjust some of the forces and moments acting on at least one of the wheel-mounted tires as the apparatus operates, e.g., loads applied to the at least one of the wheel-mounted tires, stiffness of the suspension, anti-lock braking, traction control, etc. The one or more controller may include transponders such that such operations of the apparatus may be controlled remotely using wireless signals. Each of such controllers may comprise an electronic control module (ECU) which is programmed to control the various operations of the mobile tire testing apparatus and which receives inputs from all of the discussed sensors, as well as other sensors provided with the apparatus, wireless signals from outside of the apparatus, etc. The apparatus may also include a navigation system including a GPS system which provides inputs to the one or more controllers pertaining to the location and vicinity of the apparatus, traveling motions and directions of the apparatus. Data acquisition pertaining to the tire testing operations performed by the tire testing apparatus may also be controlled by the one or more controllers, whether the data is processed by the controllers and/or by other means. Each such controller may include a memory which stores predetermined control parameters which are selected based on sensed inputs to the controller, and predetermined algorithms which can be used to determine appropriate control parameters based on the sensed inputs to the ECU. The controller(s) may operate the apparatus without a passenger disposed on/with the apparatus.

It is desirable that the apparatus have sufficient weight that the tires being tested are supporting loads that correspond to loads that the tires will support in normal operation when disposed on conventional vehicles. This can be accomplished by attaching appropriate ballast(s) to the apparatus to replicate actual conditions experienced by the tires during normal use. Ballast(s) can be added in various appropriate manners, e.g., securing weight(s)/ballast to various portions of the apparatus, such as inside, on top, on the sides and/or on the bottom of the apparatus, to increase the vertical load of the single rear tire and to increase the load and weight transfer of the opposite pair of tires.

Such mobile tire testing apparatus according to the first aspect and embodiment of the present invention may be configured to test and monitor the third wheel-mounted tire provided centrally at one end portion of the chassis, and can also be configured to test and monitor either or both of the wheel-mounted tires at the opposite end portion of the apparatus. Testing of more than one of the wheel-mounted tires can happen simultaneously as the apparatus is operated and travels. For such purpose, the appropriate sensor(s) may be provided for monitoring operational characteristics and collecting data for each of the tires being tested, e.g., the force and moment sensors and the tire slip angle sensors provided in operative association with the tires and configured to detect forces and moments acting on the tires as the apparatus travels; sensors which detects loads applied to the tire, sensors which detect side slip of the tested tires; sensors which detect speed and acceleration of the tested tires; sensors which detect travel position of the suspensions which attach the wheel-mounted tire to the chassis, etc. Each of the three wheel-mounted tires may be connected to the propulsion device and the braking device, independently or in combination with one or both of the other tires, so that each of the wheel-mounted tires is capable of rolling free, driving or braking the testing apparatus, as well as supporting the apparatus.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a cover system according to the invention and specific alternative structures and modifications thereto, the embodiments chosen for the purposes of illustration and description of the structure and method of the invention are shown in the accompanying drawings forming a part of the specification

BRIEF DESCRIPTION OF DRAWINGS

FIG. 2 is a view reflecting interactions of a control, measurement and data acquisition systems of the mobile tire testing apparatus of FIGS. 1A to 1C.

FIGS. 3A-3D are diagrams explaining load force calculations for a four wheeled vehicle testing apparatus, with FIG. 3A being a side view pertaining to vertical load force calculation with no cornering force present, FIG. 3B being a front view pertaining to vertical load force calculation with no cornering force present, FIG. 3C being a front view pertaining to vertical load force calculation with cornering force present, and FIG. 3D being a plan view pertaining to vertical load force calculation with cornering force present.

FIGS. 4A-4D are diagrams explaining load force calculations for a three wheeled vehicle testing apparatus, with FIG. 4A being a side view pertaining to vertical load force calculation with no cornering force present, FIG. 4B being a front view pertaining to vertical load force calculation with no cornering force present, FIG. 4C being a front view pertaining to vertical load force calculation with cornering force present, and FIG. 4D being a plan view pertaining to vertical load force calculation with cornering force present.

DETAILED DESCRIPTION OF EXEMPLARY EMBODIMENTS OF THE PRESENT INVENTION

Figure 1A:
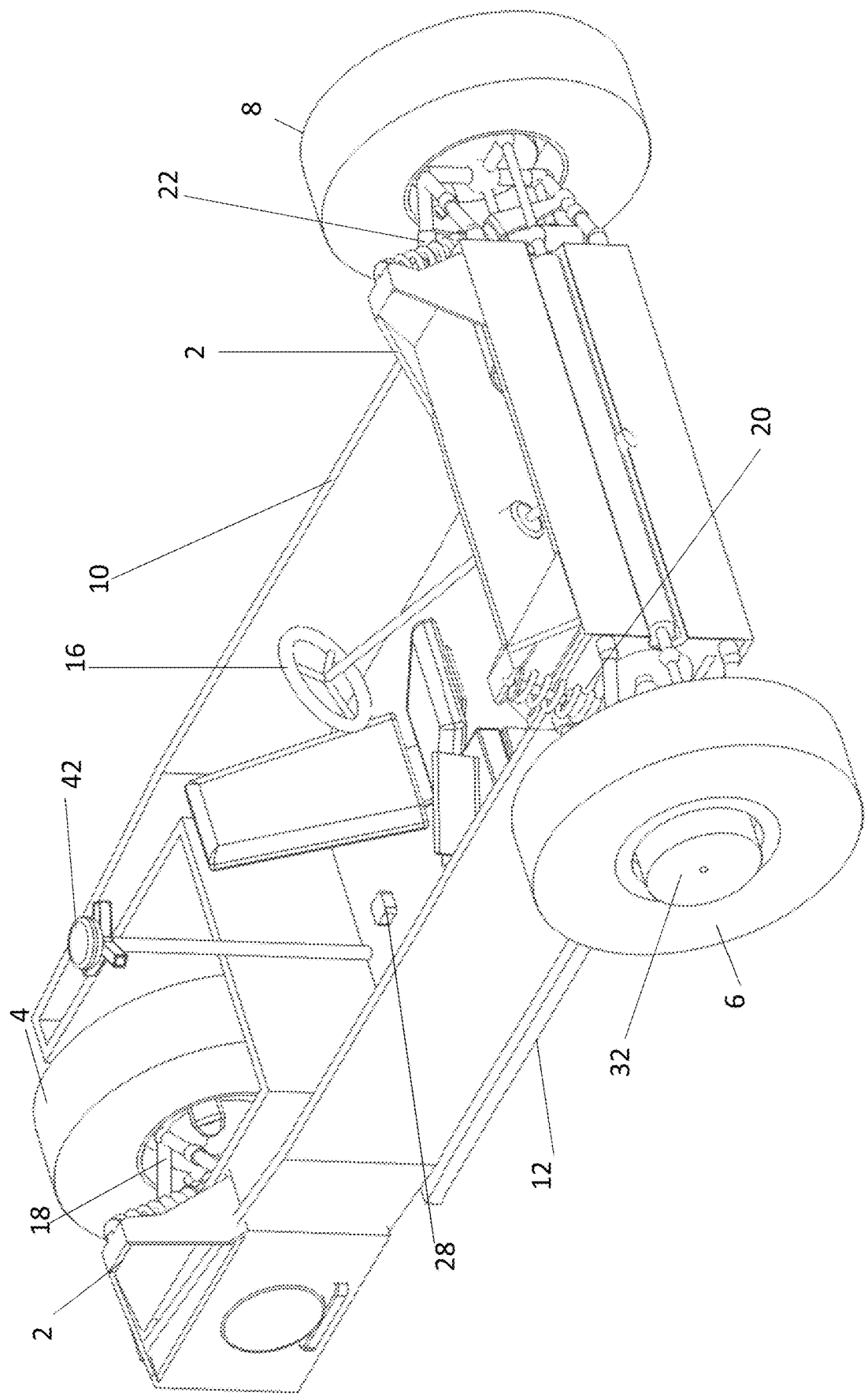
FIGS. 1A to 1C are schematic views of a mobile tire testing apparatus according to a first exemplary embodiment of the present invention, including steering and slip angle sensors operatively associated with steering and braking systems of the apparatus, with FIG. 1A being a front, top perspective view of the testing apparatus, FIG. 1B being a view similar to FIG. 1A but with an outer body removed to better show internal structure, and FIG. 1C being a front, bottom perspective view of the testing apparatus
Figure 1B:
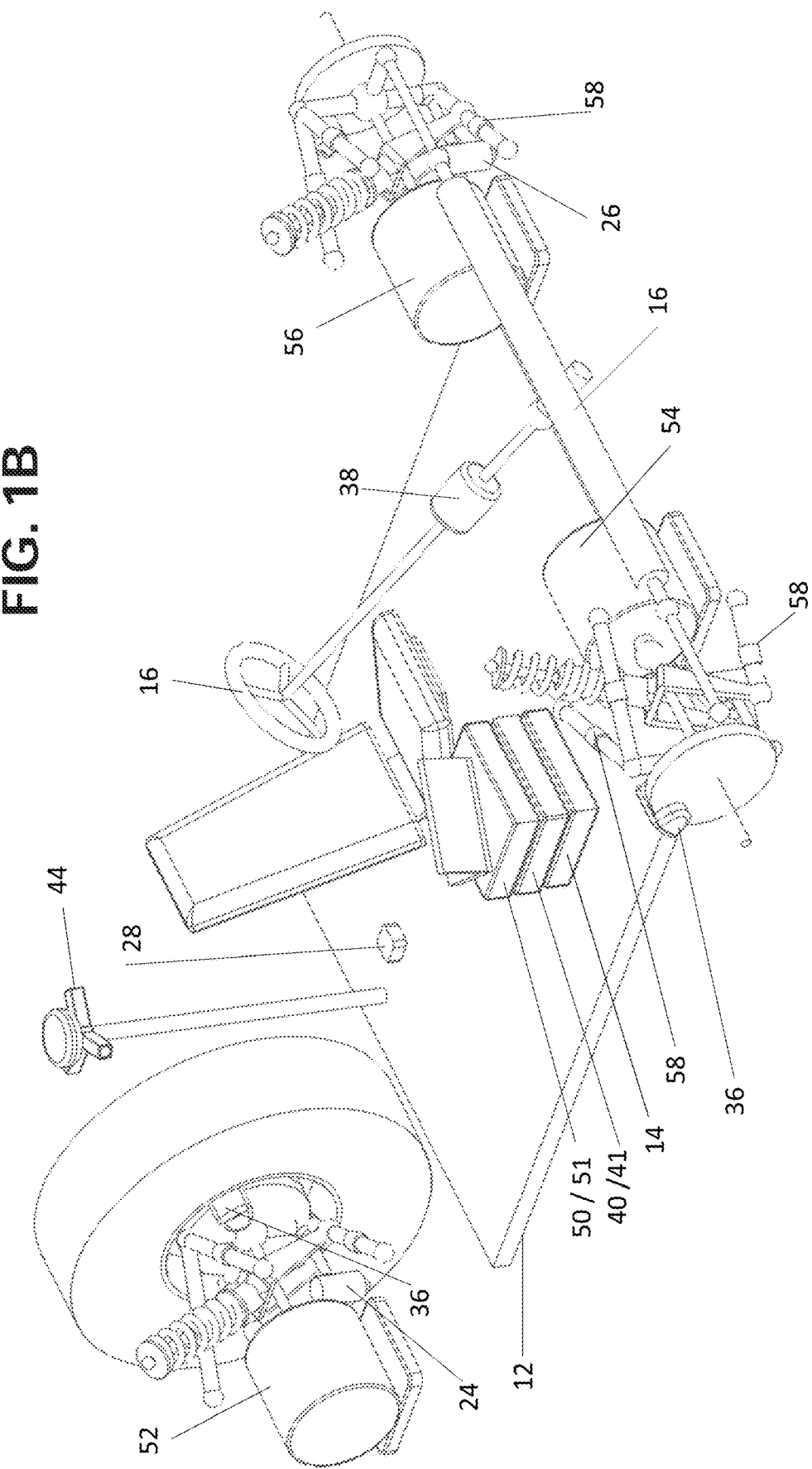
Figure 1C:
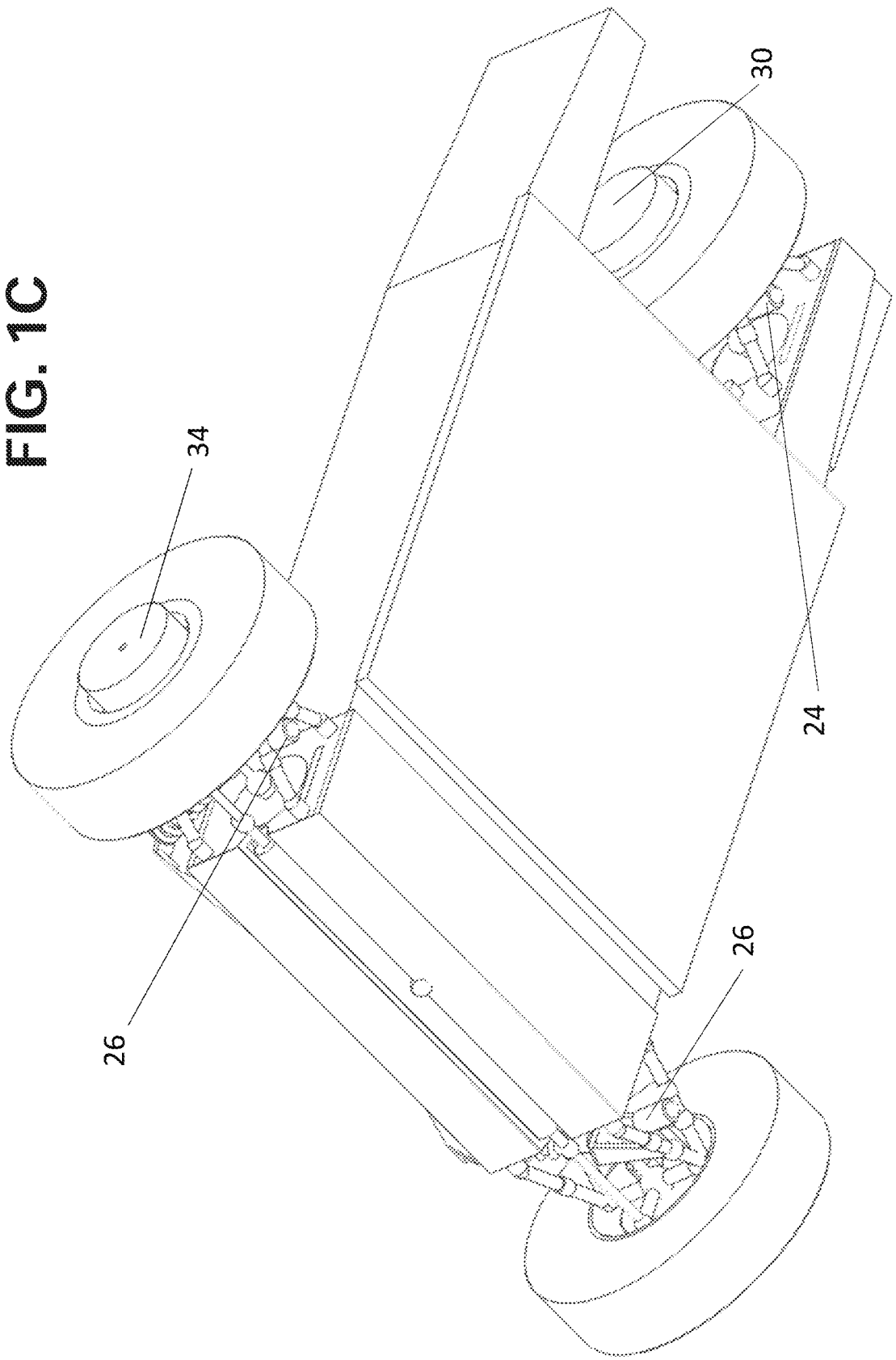

Referring to FIGS. 1A to 1C there are shown schematic views of a mobile tire testing apparatus 1 according to a first exemplary embodiment of the present invention. FIGS. 1A to 1C schematically show some important features of the apparatus, while some other features of the apparatus are not depicted in FIGS. 1A to 1C, but will be discussed herein and will be understood based on the structures of conventional automotive vehicles.

The testing apparatus 1 generally includes: a chassis 2 having a body 10 provided therewith; three wheel-mounted tires 4, 6, 8, of which two of the tires 6 and 8 are mounted along a common axis at opposite sides of one of a front end portion or a rear end portion of the chassis and the third tire 4 is mounted centrally at an opposite end portion of the chassis from the other two tires; suspensions 18, 20, 22 for respectively supporting the wheel mounted tires 4, 6, 8 on the chassis 2, e.g., in a triangular arrangement at three corners of the chassis 2; a steering system including a steering system 16 for steering at least one, and preferably at least two, of the three wheel-mounted tires; one or more propulsion devices 52, 54, 56 provided on the chassis and operatively connected to at least one of the wheel-mounted tires, preferably independently, and configured to selectively drive the wheel-mounted tires to propel the testing apparatus 1 for travelling at various speeds and accelerations; a braking system 36 operatively connected to each of the three wheel mounted tires 4, 6, 8; one or more ballasts 12 which may be selectively provided at different parts of the chassis 2 for adjusting vertical loading applied to one or more of the tires; a variety of sensors which provide information regarding the general operations of the testing apparatus 1 and the environment in which the apparatus is situated, as well as information regarding the tire(s) testing being performed by the testing apparatus; a navigation system including GPS 42; and one or more controllers 14 which may be used to partially or fully, automatically control general and testing operations of the testing apparatus 1.

The chassis 2 may be of any appropriate type, e.g., frame-based, a unibody construction, etc., and along with the wheel-mounted tires 4, 6, 8 and the suspensions 18, 20, 22 will provide sufficient support for the testing apparatus 1 and any loads provided thereon. The body 10 may include an enclosed passenger space which accommodates one or more passengers such as persons who operate the apparatus, as well as space for the one or more propulsion devices and other components of the apparatus. While the body 10 may include an enclosed passenger space, the apparatus 1 may be operated in a fully automated, robotic manner with or without any person supported on the apparatus. The one or more ballasts 12 may be selectively provided with the chassis 2 and/or body 10 to add appropriate load(s) to the apparatus and for adjusting vertical loading applied to one or more of the wheel-mounted tires 4, 6, 8 being tested, apart from the other loads supported by the apparatus. The ballasts 12 may be configured to be mounted to various portions of the apparatus, such as inside, on top, on the sides or on the bottom of the chassis, and may also be configured to be removable so that they can be added or removed as desired.

The suspensions 18, 20, 22 may have any appropriate structure which permit the wheel mounted tires to be fully tested and steered over a wide range of parameters, and one or more of the wheel-mounted tires may be connected to the chassis without a suspension, e.g., such tire may be rotatably mounted to chassis using a fixed spindle (not shown). The suspensions may include four bar suspension linkages, spring and shock/strut assemblies instrumented with load cells, control arms with load cells 58 integrated axially, two of the load cells 58 associated with the pair of coaxial tires 6, 8 are depicted and the single tire 4 also has a load cell that is not depicted, two force member control arms, etc. The suspensions may be height adjustable and camber adjustable independently for each of the three wheel-mounted tires 4, 6, 8, for test tire inclination angle and camber angle adjustment, etc., although such adjustable features are not depicted.

The one or more propulsion device(s) 52, 54, 56 may include one or more of an internal combustion (IC) engine with a transmission, electric motor(s), batteries, a fuel cell, etc. For example, the propulsion devices may involve a hybrid arrangement including an IC engine which generates electricity, batteries such as lithium ion batteries which store electricity generated by the IC engine and electric motors that rotate the wheel mounted tires and are powered by electricity from the batteries and/or the IC engine. The propulsion device(s) may be controlled to selectively drive the paired wheel-mounted tires 6 and 8, the single wheel-mounted tire 4 or all of the tires. Preferably, independent power trains will be provided for the wheel-mounted tires 4, 6 and 8, respectively.

The steering system 16 may be operatively connected to the paired wheel mounted tires 6 and 8, whether these tires are disposed at a front portion or rear portion of the apparatus, and/or to the single wheel mounted tire 4. For example, the steering system may include a parallel steering angle geometry of the paired wheel-mounted tires 6, 8 that permits parallel steering of front tires over a very wide range, e.g., such that the apparatus 1 can achieve tire slip angles of 25° or more to thereby allow the apparatus to 'spin out' and thereby saturating the cornering potential of the single wheel-mounted tire 4 being tested. The tire slip angle sensor(s) 26 may be connected in parallel to the steered tires so that the induced steering angle can be excluded from the tire slip angle measurements. The steering system 16 may be manually operated by an operator disposed on the apparatus using a steering wheel or the like or may be automatically steered by an electric motor 38 in conjunction with the one or more controllers 14 based on inputs from the various sensors and/or based on wireless signals, signals from the GPS system, operational control signals, etc.

The braking system 36 may be operatively connected to each of the wheel mounted tires 4, 6, 8, and may be provided with anti-lock braking and tractive control capabilities. The braking system may be manually operated by an operator disposed on the apparatus using a brake pedal or other control member, or may be automatically braked by the one or more controllers 14 based on inputs from the various sensors and/or based on wireless signals. The braking system 36 may be individually connected to each of the wheel mounted tires and configured to brake each tire individually.

Tire force and moment load cell transducers 30, 32, 34 may be mounted coaxially with at least the rear wheel mounted tire 4 and possibly with the wheel mounted tires 6, 8 at the opposite end of the chassis to measure tire force and moments directly. Tire slip angle sensors 24, 26, may be mounted associatively with each wheel mounted tire to measure the individual tire slip angles directly. The slip angle sensors associated with the steered wheel mounted tires 6, 8 may be mounted so as to rotate in unison with the steering motion of each wheel mounted tire.

Apparatus Control and Data Acquisition Systems

Referring to FIGS. 1A to 1C and 2, there are shown schematic views of an onboard data acquisition system 40 and a control system 50 of the mobile tire testing apparatus of FIGS. 1A to 1C. Information acquired by the data acquisition system 40 may be provided to the control system 50 for use in controlling operations of the apparatus 1, including operations relating to movement and travel of the apparatus and relating to tire testing operations being performed by the apparatus. The information acquired by the data acquisition system 40 may also be stored in a memory 41 of the data acquisition system 40 so that the data may be subsequently analyzed for determining characteristics of the tires being tested by the apparatus 1.

Figure 5:
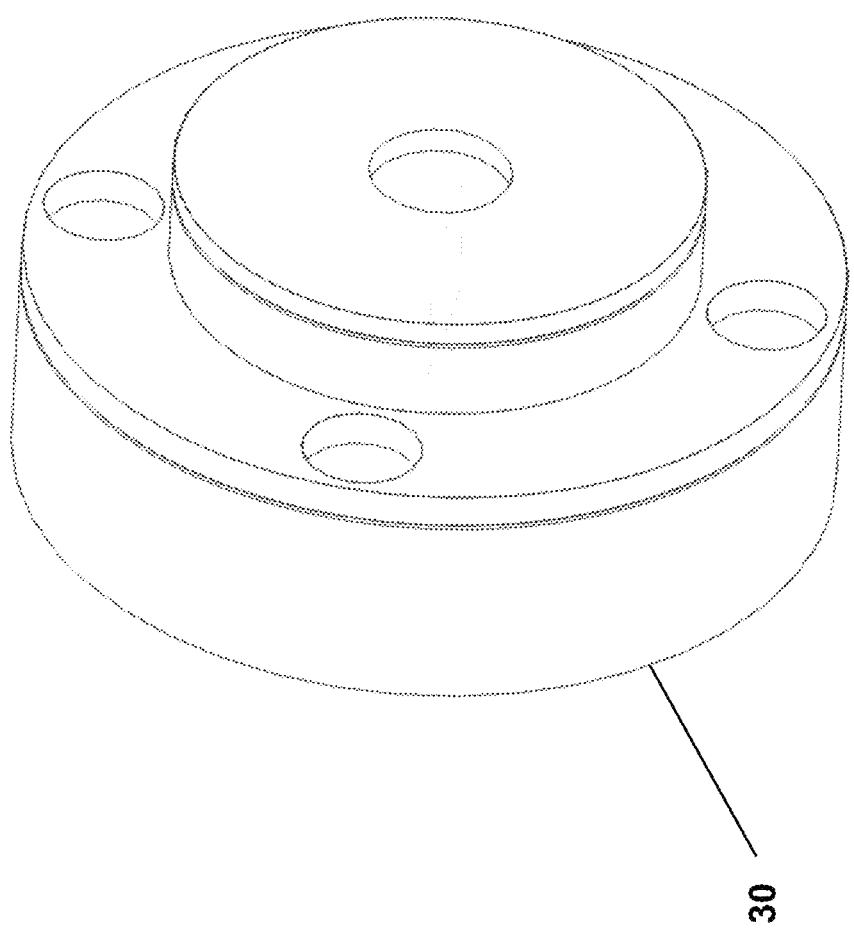
FIG. 5 is a perspective view of a conventional wheel force transducer which may be used to monitor tire forces and moments in a mobile tire testing apparatus according to present invention.
Figure 6A:
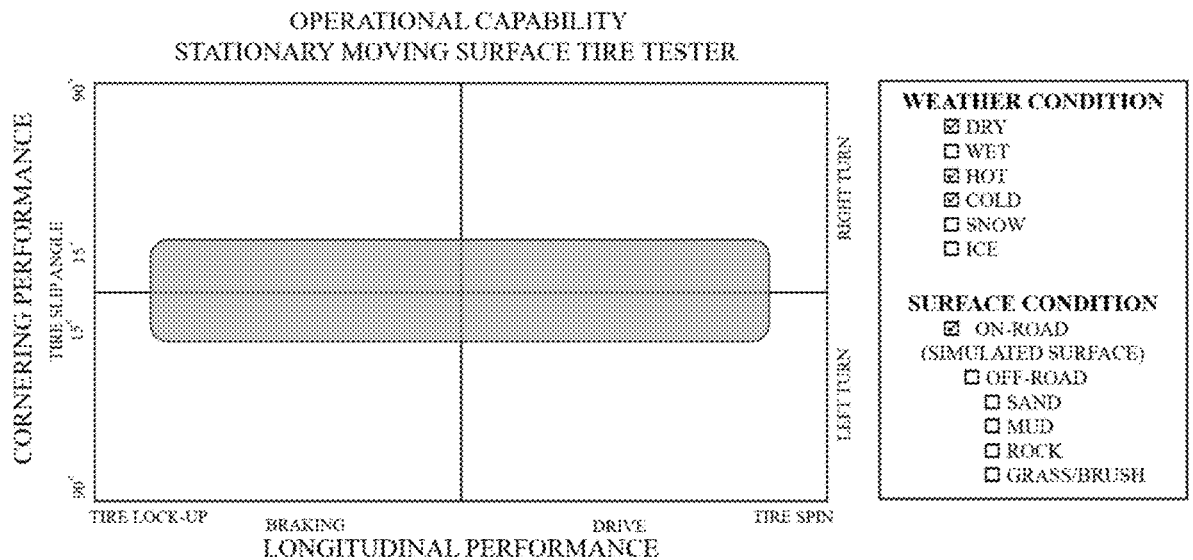
FIGS. 6A-6F illustrate the range of testing capability for conventional tire testing apparatus and for the tire testing apparatus according to the exemplary embodiment of the present invention.
Figure 6B:
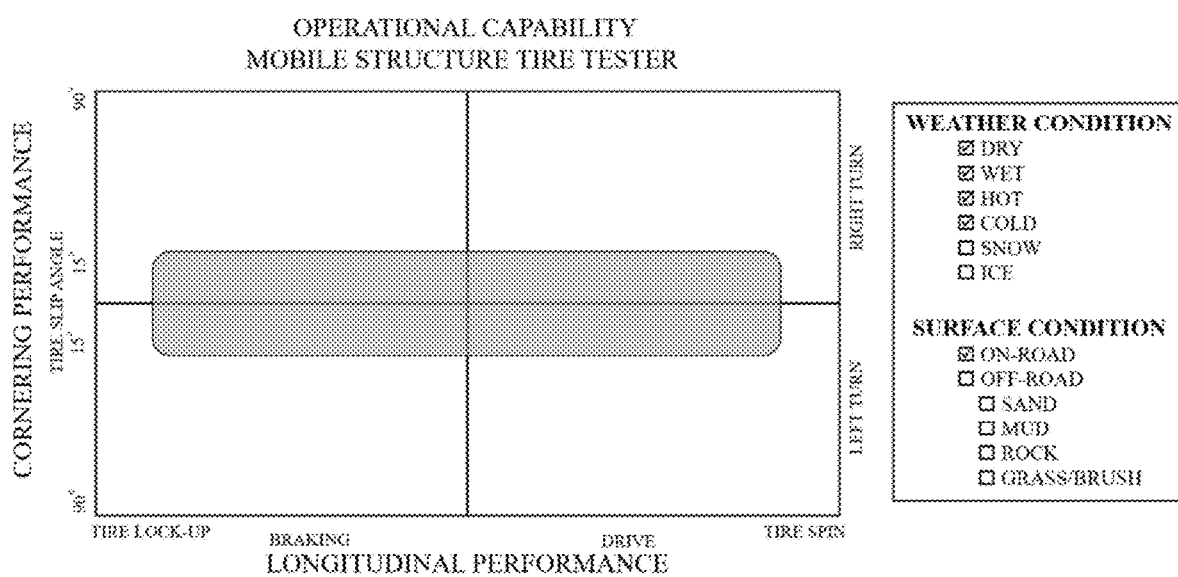
Figure 6C:
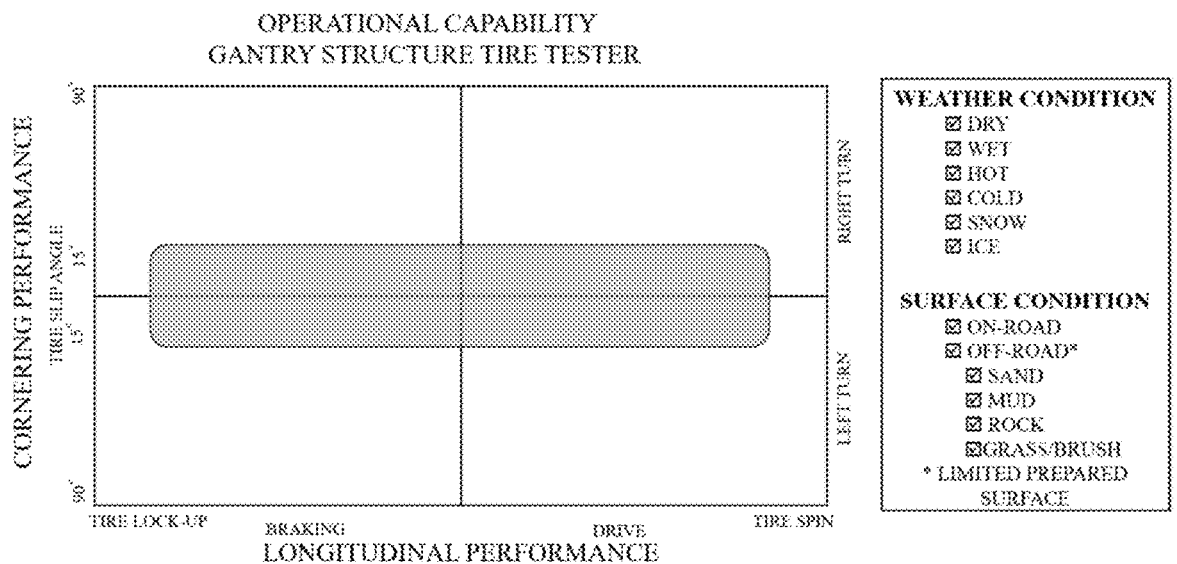
Figure 6D:
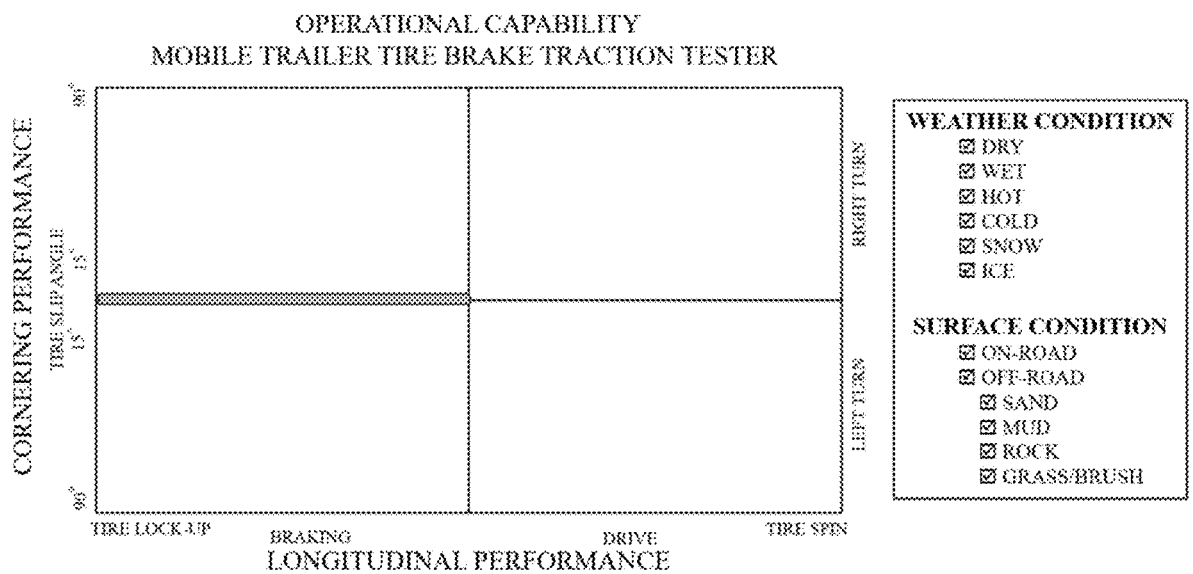
Figure 6E:
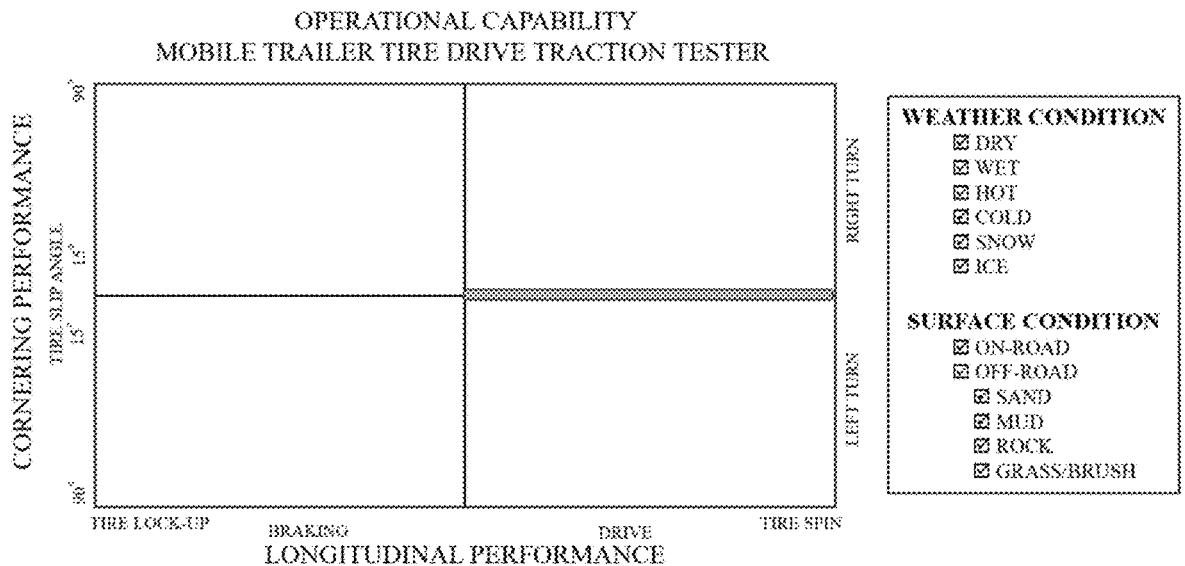
Figure 6F:
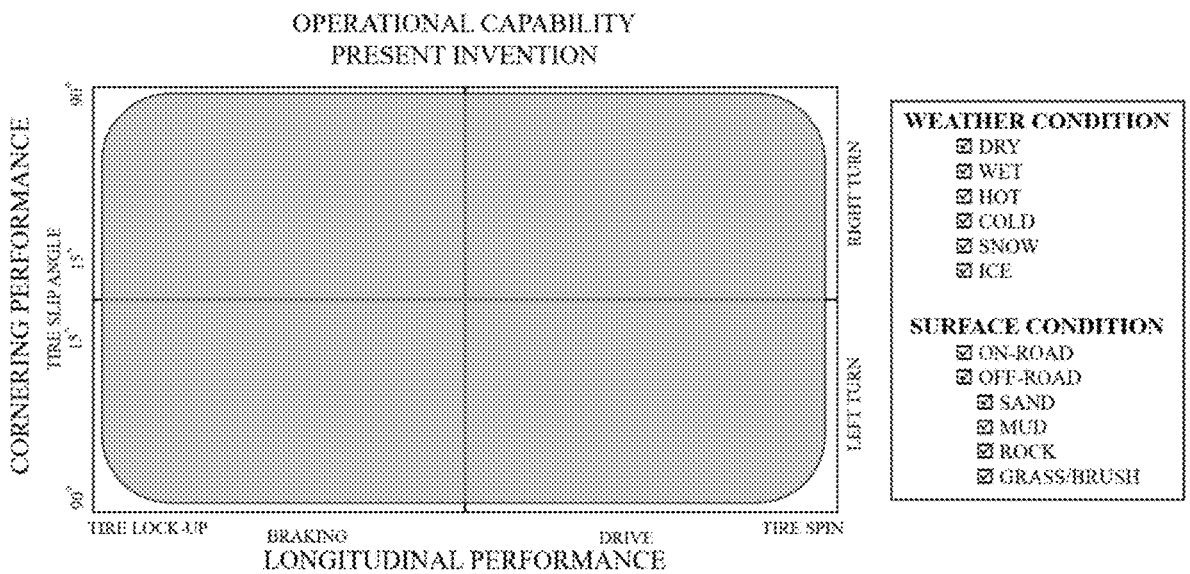

The onboard data acquisition system 40 may include: an inertial measurement unit 28 having various sensors and inputs pertaining to global operations of the apparatus 1 in general; one or more imaging devices 44 which monitor the surroundings surrounding around the apparatus as operates; force, moment and position sensors which detect data pertaining to operational characteristics of one or more of the wheel-mounted tires 4, 6, 8 being tested by the apparatus 1, the memory 41, a navigation system 42 including a global positioning system (GPS), etc. The inertial measurement unit 28 may include: sensors which detect the lateral, longitudinal and vertical accelerations of the apparatus 1, sensors which monitor pitch, roll and yaw rate of the apparatus 1, etc. The sensors which detect operational characteristics of one or more of the wheel-mounted tires 4, 6, 8 being tested by the apparatus 1 may include: wheel force and moment sensors 30, 32, 34 such as shown in FIG. 5, provided with each of the wheel-mounted tires 4, 6, 8; sensors which detect the physical position and orientation of each of the wheel-mounted tires 4, 6, 8; side slip sensors 26 associated with the paired wheel-mounted tires 6, 8, which are preferably steered and disposed at one end portion, e.g., front or rear, of the apparatus 1; a side slip sensor 24 associated with the single wheel-mounted tire 4; sensors associated with the suspensions 18, 20, 22, including loads cells 58 provided with control arms of the suspensions; load cells provided with spring and shock/strut assemblies of the suspensions (not shown); position and velocity sensors which monitor travel positions and velocities of the suspensions; etc. (not shown). The force and moment sensors 30, 32, 24 may, for example, be RoaDyn S530™ Tire Force and Moment Sensors from Kistler.

The control system 50 includes the one or more controllers 14, and may receive inputs and data from various sources, including the data acquisition system 40, the navigation system 42 including the global positioning system (GPS), wireless signals from remote locations outside of the apparatus, etc. Each of such controllers 14 may comprise an electronic control module (ECU) which includes a memory 51 and may be programmed to control the various travelling and tire testing operations of the mobile tire testing apparatus 1 based on inputs the controller(s) receive from all of the sensors provided with the apparatus, from the navigation system 42 including the GPS, from the wireless signals originating outside of the apparatus, etc. The controller(s) 14 may automatically control some or all travelling operations of the apparatus by controlling the braking, steering, accelerations of the apparatus, although a passenger disposed with the vehicle may also be permitted to selectively, manually control some or all of such operations using manual controls, including the steering wheel 16, brake system controls and the propulsion device(s) provided with the apparatus. The controllers(s) 14 may also control tire testing operations performed by the apparatus 1, including adjustment of some of the forces and moments acting on at least one of the wheel-mounted tires 4, 6, 8 as the apparatus operates, e.g., loads applied to at least one of the wheel-mounted tires 4, 6, 8, stiffness of the suspensions 18, 20, 22, anti-lock braking and traction control, etc.

Operations of the data acquisition system 40 may also be controlled by the controller(s) 14, whether the data is processed by the controllers and/or by other means. The memory 51 of each of the controllers may store predetermined control parameters which are selected based on sensed inputs to the controller, and predetermined algorithms which can be used to determine appropriate control parameters based on the sensed inputs to the ECU. The controller(s) may operate the apparatus without a passenger disposed on/with the apparatus.

With such mobile tire testing apparatus according to the first aspect and embodiment of the present invention, at least the single wheel-mounted tire 4 at the central rear or front portion of the apparatus is tested in relation to various force and moment testing conditions, which can be divided into two categories. i.e., tractive testing which quantifies longitudinal tractive and braking forces, and lateral force testing which quantifies slip and cornering forces and moments as the tire moves laterally, but which may also involve tractive and braking forces present in addition to cornering forces.

Capability

Such a three-wheeled, movable, self-propelled tire testing apparatus according to the exemplary embodiment of the present invention has a much larger range of testing parameters than the conventional tire testing apparatus. This is largely due to it's unique arrangement/layout with the three wheel-mounted tires 4, 6, 8 disposed in a triangular arrangement at the two end portions of the apparatus, which 1 does not face many of the practical limits of the conventional testing apparatus, whereby the tires being tested can be subjected to a much wider range of testing conditions than is possible with the conventional testing apparatus, and which fully encompasses all of the conditions the tires will face during actual, normal use. Modern data gathering and processing technology is advanced and allows the expanded amounts of data that can be obtained with the unique three-wheeled, movable, self-propelled tire testing apparatus 1 according to the exemplary embodiment of the present invention to be analyzed with precision. This leads to expanded static and dynamic force and moment information about the tires being tested and expanded understanding of the characteristics of the tires. In other words, the tire testing apparatus according to the present invention permits the tested tires' characteristics to be monitored under wider ranges of operating conditions which leads to the tire characteristics being more fully and accurately determined.

The tire testing apparatus 1 according to the exemplary embodiment of the present invention can be steered, braked and operated to the full extent of any conventional vehicle, while also controlling vertical loading, such that the apparatus is capable of exercising a tire and acquiring longitudinal and lateral tire force and moment data throughout the tire's full operational envelope on any surface and in any weather condition which the tires may experience in actual use, including up to full side slip saturation of 90 degrees. As shown and described, the tire testing apparatus is stand-alone and is configured to operate in an unrestrained manner. In other words, the testing apparatus according to the present invention can permit a tire be fully subjected to a greatly increased range of force and moment testing conditions, including extreme, real on road and off road conditions which are not achievable using any conventional tire testing apparatus, thereby permitting more complete tire testing information to be acquired than is possible with conventional tire testing apparatus.

FIGS. 6A-6F illustrate the range of testing capability for conventional tire testing apparatus and for the tire testing apparatus according to the exemplary embodiment of the present invention.

As can be seen in FIGS. 6A-6F, the present invention has a significantly broader range of performance capability than any conventional tire testing apparatus.

Some important aspects for a tire testing apparatus are discussed below.

Weight Transfer

The known mobile testing apparatus involving a conventional four wheel vehicle, wherein the four wheels are disposed in two pairs provided respectively at front and rear portions of the vehicle, monitors the characteristics of at least one of the four wheel-mounted tires as the apparatus travels. With such conventional vehicle tire testing apparatus having four wheel-mounted tires, vertical forces acting on the tested wheel-mounted tires are inconsistent due to road unevenness, vehicle load distribution and lateral weight transfer distributed between each of the four wheel-mounted tires. Correspondingly, the dynamic forces and moments imposed on the tested tires of such a four-wheeled testing apparatus are not as consistent as that of the three-wheeled testing apparatus according to the exemplary embodiment of the present invention, and of the tested tire characteristics obtained using the four wheeled testing apparatus are not as consistent as the tested tire characteristics obtained using the three wheeled testing apparatus according to the exemplary embodiment of the present invention.

In addition to testing of the single tire 4 centrally positioned at one end portion of the apparatus 1, the pair of tires 6, 8 at the opposite end portion of the apparatus may also be instrumented and tested in unison with the single tire 4 of the three wheeled testing apparatus according to the present invention. The paired tires 6, 8 will experience equal and opposite vertical weight transfer consistent with the centrifugal force being developed. However, because the apparatus 1 is three wheeled, the increase in vertical load of the outside tire of the pair would be equal to the decrease of vertical load of the inside tire, such that any computations relating to the tested characteristics would still be relatively simple in comparison to computations for a four wheeled testing apparatus.

Test Location/Surface Operation

Regarding the expanded testing capabilities of the three wheeled tire testing apparatus 1 according to the exemplary embodiment of the present invention, the inventor has determined that the self-contained nature and the relative size and arrangement of such a three-wheeled, movable, self-propelled tire testing apparatus allows for essentially unlimited testing of longitudinal and lateral force and moment characteristics on essentially any surface, whether paved or off-road, and in any weather condition, especially for the single, centrally positioned wheel-mounted tire 4. However, the apparatus 1 also provides expanded testing for the two front wheel-mounted tires based on the three-wheeled nature of the apparatus. Of course, there may be some practical limits due to the surface on which the three-wheeled, movable, self-propelled tire testing apparatus is capable of operating upon.

Steering And Tire Slip Angle Capability

The three-wheeled, movable, self-propelled tire testing apparatus 1 according to the exemplary embodiment of the present invention is capable of developing very substantial cornering forces and tire slip angles as a consequence of ability to steer the coaxial pair of wheel-mounted tires 6, 8 provided at one end portion of the apparatus, i.e., front or rear end portion, up to and past cornering force saturation limits of the tires, as well as a full utilization of the road surface friction available with the by the single tire 4 at the other end portion of the apparatus.

The apparatus end with the pair of tires will inherently develop more cornering force than the single tire at the opposite end. This inherent cornering force imbalance will allow the single tire to fully saturate it's cornering force and slip angle. When the single tire is at the rear of the apparatus, the apparatus will tend to 'spin out' during a cornering test maneuver saturating the rear tire cornering potential and maximizing that tire's slip angle to 90 degrees.

With these capabilities, the achievable slip angle of single tire 4 can exceed 90 degrees. This is possible because of the three wheeled configuration that can be induced to oversteer as cornering forces develop, ultimately allowing the vehicle to 'spin out' and thereby saturating the cornering potential of the single wheel-mounted tire 4. Spin out can be visualized as the vehicle rotating until the vehicle's forward direction is perpendicular to the path of travel. In comparison, the conventional four wheeled mobile force and moment tire test apparatus are typically limited to slip angles significantly less than 90 degrees, usually less than approximately 25 degrees.

Combined Tractive And Slip Angle Operation

The enhanced abilities of the tire testing apparatus 1 according to the exemplary embodiment of the present invention creates opportunities for the three wheeled testing apparatus according to the present invention to measure tractive and lateral tire force and moment characteristics in any conditions of interest, including opportunities to accurately acquire tractive and lateral tire force and moment data that cannot be acquired using the conventionally known tractive and lateral tire force and moment testing apparatus.

Tire Inclination Angle (Camber) Variation

The tire angle to the ground can be varied by adjusting the ride height of the pair of coaxially arranged tires 6, 8 individually. For example, one side can be raised and the opposite side can be lowered to establish a desired inclination (camber) angle between the tires being tested and the ground.

Advantages Provided by the Novel Testing Apparatus

The mobile tire testing apparatus 1 according to the first aspect and embodiment of the present invention provides important advantages over conventional tire testing apparatus. Based on its three wheel-mounted tire configuration, with at least the single, third tire being tested, there is minimal disturbance of vertical loads applied to the tested tire compared to a tire testing vehicle or apparatus that has four or more tires supporting its weight and where one of the supporting tires is being tested. Further, the three wheeled apparatus 1 allows the tire forces and moments to be reliably distributed dynamically between the three tires, which is not possible in a four wheeled vehicle. The reliable distribution of tire forces and moments on the three wheeled apparatus makes the test loading and results more predictable and controllable according to the present invention.

Additionally, the three wheeled testing apparatus according to the first aspect and embodiment of the present invention can operate on essentially any paved or unpaved terrain within the full operating envelope of the tested tires, and without any significant limitation being imposed by the physical configuration of the testing apparatus itself. This is in contrast to the conventional tire testing apparatus the physical configurations of which limit the extent to which the tires can be tested, e.g., conventional mobile tire testing apparatus are generally limited to on-road testing, e.g., mostly on paved road surfaces, but also on unpaved road surfaces to some extent. To any extent the conventional mobile tire testing apparatus may be able to travel on unpaved surfaces, none of these conventional testing apparatus can go 'off-road' on challenging terrains involving mud, rocks snow, ice, etc. over any significant distance. When conventional pick-up type, four wheeled vehicles are used for tire testing, typically they are used only for longitudinal testing of traction, not for any cornering tests. When the conventional multi-wheeled, e.g., eighteen (18) wheeled, truck/trailer apparatus are used, they can only steer up to about 15 degrees from straight ahead, and cannot operate off road for testing purposes. While there are conventional off-road tire testing apparatus, these typically involve a moving gantry supporting a test tire as the apparatus travels over a limited surface distance consisting of an artificially prepared surface with limited operational and weather capability.

The mobile tire testing apparatus 1 according to the first aspect and embodiment of the present invention has other enhanced capabilities, which the conventional testing apparatus do not have because they are limited by their physical configurations. The enhanced capabilities include that the testing apparatus is capable of: operating in any weather condition; operating at low and high speeds consistent with what will be experienced when the tires are later used on actual vehicles; free rolling, accelerating or braking; traveling longitudinally, turning at slip angles of 25+ degrees; being easily transportable to any desired testing location world-wide; testing more than one of the three supporting tires simultaneously; selective manual control by an on-board operator who can control the steering, speed/acceleration, braking of the apparatus or automated control by the apparatus' control systems, which may be provided with the apparatus and remotely operated using wireless signals, etc. Such mobile tire testing apparatus according to the first aspect and embodiment of the present invention is even capable of 'spinning out' and letting the tire slip angle sweep from straight ahead to 90 degrees or more on any travelable surface, fully exercising the tire. This offers a significant increase in tire testing capability.

Facilitated Data Acquisition

In addition to the advantages provided by the enhanced testing capabilities of the tire testing apparatus 1 according to exemplary embodiment of the present invention, the unique three point, triangular arrangement/layout of the apparatus also advantageously permits facilitated testing data acquisition in comparison to the conventional tire testing apparatus, including the convention testing apparatus which involves four wheeled vehicles. This facilitated data acquisition makes the testing apparatus 1 more advantageous in relation to the conventional testing apparatus. The unique three point, triangular arrangement/layout of the apparatus 1 permits the three vertical tire forces and the single tire's tire cornering force of the apparatus to be resolved from global vehicle performance measurements, using readily solvable dynamic equations for acquiring important testing data based on the three-wheeled, unrestricted configuration of the apparatus. The three points of contact to the ground, respectively correspond to the three wheel-mounted tires, and permit far more consistent and readily solvable dynamic equations to accurately determine the vertical loads imposed on the tested tires in comparison to the conventional tire testing apparatus.

As discussed herein, there are some inherent limitations of the conventional four wheeled vehicles as tire testing apparatus relating to vertical loading, traveling surface consistency and cornering which make such four wheeled vehicles poor tire testing apparatus. Four vertical tire forces and four tire cornering forces need to be measured by a four wheeled tire testing apparatus, but a four wheel vehicle does not allow any of the eight forces to be resolved from global vehicle performance measurements. These inherent limitations do not apply to the three wheeled tire testing apparatus according to the exemplary embodiment of the present invention, and will be explained further in relation to below and in relation to FIGS. 3A-3D and 4A-4D.

The three wheel testing apparatus 1 according to the exemplary embodiment of the present invention inherently does not have the same interaction and 'cross talk' issues as a four wheel testing apparatus. A three wheeled apparatus experiences all of the lateral weight transfer at the axle with the pair of tires. The single tire at the opposite axle or end portion of the apparatus does not resist vehicle roll, provide any roll stiffness or experience lateral weight transfer. In addition, the unevenness of surface elevation under the three tires does not result in any redistribution of vertical load because three points define a plane regardless of the slope or unevenness of the surface. The result is that a three wheeled apparatus' vertical load distribution on its tires is more constant.

The interaction and 'cross talk' that is present in a four wheel testing apparatus due to lateral weight transfer and surface unevenness does not exist in the configuration of the three wheel testing apparatus' 1. So the three wheeled apparatus' performance measurements are stable compared to those of a four wheel testing apparatus and can be used to predict and control the tire vertical forces required for cornering force measurements. The three wheeled testing apparatus 1, having a single tire at one end, allows the apparatus' performance measurements to be used directly to quantify that tire's performance. The opposite end of the testing apparatus, having a pair of tires has inherently stable vertical force control needed for individual tire force and moment measurement. Three vertical tire forces and three tire cornering forces need to be measured, and the three wheel apparatus 1 allows four of the six forces to be resolved directly from global vehicle performance measurements.

Figure 3A:
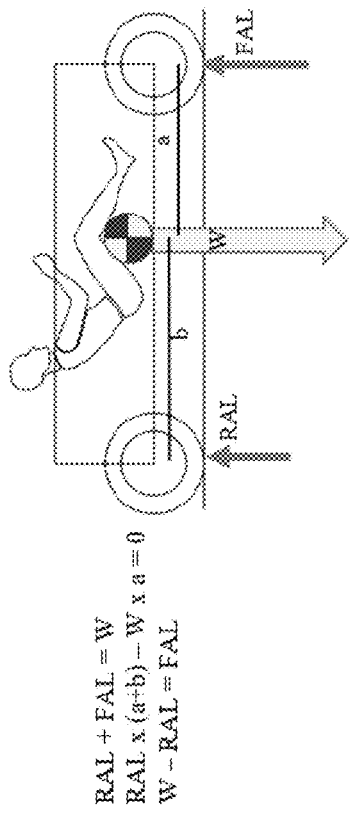
Figure 3B:
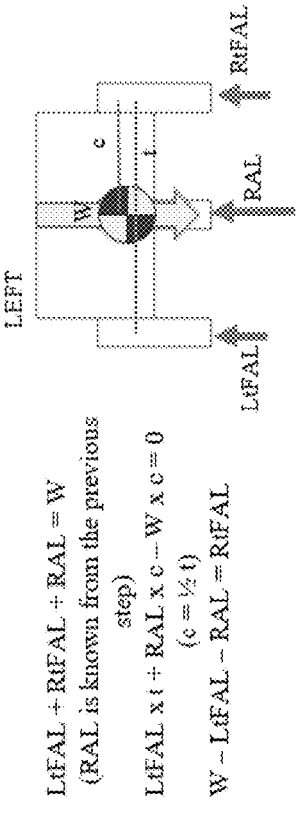

Referring to FIGS. 3A-3D and FIGS. 4A-4D: FIGS. 3A and 3B are respectively side and front views explaining vertical load force calculation with no cornering force present for the conventional four wheeled testing apparatus, and should be compared to FIGS. 4A and 4B which are corresponding side and front views explaining vertical load force calculation with no cornering force present for the three wheeled apparatus of the present invention; while FIGS. 3C and 3D are respectively front and plan views explaining vertical load force calculation with cornering force present for the conventional four wheeled testing apparatus, and should be compared to FIGS. 4C and 4D which are corresponding front and plan views explaining vertical load force calculation with cornering force present for the three wheeled apparatus of the present invention. The explanation below is made based on the premise that for Static Equilibrium to be achieved with each of the tire testing apparatus the following equations must be satisfied:

$\Sigma Fx=0$, summation of forces in the X (horizontal) direction must equal zero;

$\Sigma Fy=0$, summation of forces in the Y (vertical) direction must equal zero; and $\Sigma Mz=0$, summation of moments around the Z (any rotational) axis must equal zero.

Four Wheeled Testing Apparatus No Cornering Force Present

Referring to FIG. 3A, the total rear axle load (RAL) and the total front axle load (FAL) of the conventional four wheeled testing apparatus can be calculated using this free body diagram, while noting that the sum of the vertical axle forces must equal the weight (W) of the vehicle and the sum of the moments around a cross car axis must equal zero. The total rear axle load can be calculated by summing the moments around the front axle, and because the total rear axle load and the weight are known, the total front axle load can be calculated. However, since there are two rear tires and two front tires, the individual tire loads cannot be calculated, but only the total of the pairs.

Similarly referring to FIG. 3B, the total left side axle load (LtAL) and the total right side axle load (RtAL) can be calculated using this free body diagram, while noting that the sum of the vertical axle forces must equal the weight of the vehicle and the sum of the moments around a fore/aft axis must equal zero. The left total axle load can be calculated by summing the moments around the right tires, and because the total left axle load and total weight are known, the total right axle load can be calculated. However, since there are two left tires and two right tires, the individual loads on each tire cannot be calculated from the total left side axle load and the total right side axle load.

Three Wheeled Testing Apparatus No Cornering Force Present

Figure 4A:
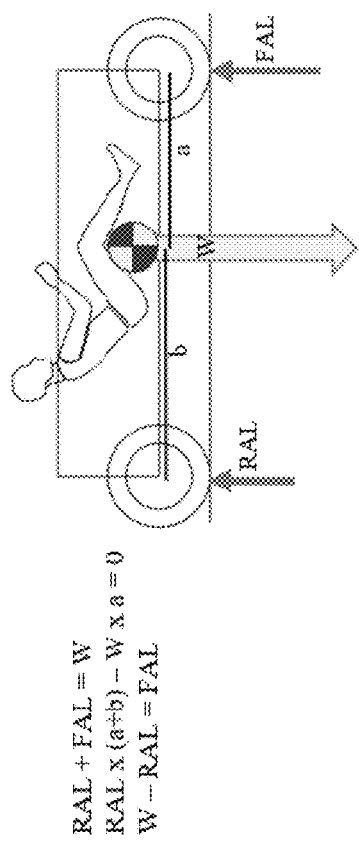

Referring to FIG. 4A, the total rear axle load (RAL) and the total front axle load (FAL) for the three wheeled testing apparatus 1 according to the exemplary embodiment of the present invention can be calculated using this free body diagram, again noting that the sum of the vertical tire forces must equal the weight of the vehicle (W) and the sum of the moments around a cross car axis must equal zero. The total rear axle load can be calculated by summing the moments around the front axle, and since there is one rear tire, the load on the rear tire is the same as the total rear axle. Since the total rear axle load and the weight are known, the total front axle load can be calculated. However, since there are two front tires, the individual front tire loads cannot be calculated, only the total of the pair.

Figure 4B:
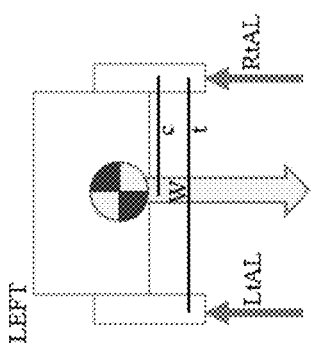

Similarly referring to FIG. 4B, the total left front side axle load (LtFAL) and the total right side axle load (RtFAL) can be calculated using this free body diagram, while noting that the sum of the vertical tire forces must equal the weight (W) of the vehicle and the sum of the moments around a fore/aft axis must equal zero. The total rear axle load and the single rear tire load has already been determined in the previous step. The total left side front axle load and the total right side front axle load can be calculated using this free body diagram, by summing the moments around the right front tire. Further, since the rear tire load, left front wheel load and total weight are known, the right front wheel load can be calculated. Thus, all three vertical tire loads are easily calculated.

Four Wheeled Testing Apparatus Cornering Force Present

Referring to FIG. 3C, noting that the individual vertical axle loads and vehicle weight do not change when cornering force is present, the total left and right axle vertical loads and total cornering force can be determined using this free body diagram. Noting that the sum of the vertical tire forces must equal the weight of the vehicle, the sum of the cornering forces at the tires (TCF) must equal the cornering force (CF), and the sum of the moments around a fore/aft axis must equal zero. The total left side axle vertical load (LtAL) can be calculated by summing the moments around the right side tires. Knowing the total left side axle vertical load and the weight, the total right side axle vertical load (RtAL) can be calculated, while the total cornering force of the four tires is equal to the cornering force. However, the distribution of cornering force between the front and rear axles and between the individual tires cannot be calculated from this free body diagram.

Referring to FIG. 3D, the total front and rear axle cornering forces (FaCF and RaCF) can be determined using this free body diagram, while noting that the sum of the cornering forces at the tires must equal the cornering force and the sum of the moments around a vertical axis must equal zero. The total rear axle cornering force (RaCF) can be calculated by summing the moments around the vertical axis at the front axle, while knowing the total rear axle cornering force and the cornering force, the total front axle cornering force (FaCF) can be calculated. However, individual front tire cornering forces cannot be calculated from this free body diagram.

Three Wheeled Testing Apparatus Cornering Force Present

Referring to FIG. 4D, the total front and rear axle cornering forces can be determined using this free body diagram, while noting that the sum of the cornering forces at the tires (RaCF and FaCF) must equal the cornering force (CF) and the sum of the moments around a vertical axis must equal zero. The total rear axle cornering force (RaCF) can be calculated by summing the moments around the vertical axis at the front axle, and since there is a single rear tire, the rear tire cornering force is equal to the total rear axle cornering force. Further, knowing the total rear axle cornering force and the cornering force, the total front axle cornering force (FaCF) can be calculated. The total cornering force of the two front tires can be calculated, but the individual front tire cornering forces cannot be calculated from this free body diagram.

Referring to FIG. 4C, the individual left and right front vertical axle loads can be calculated using this free body diagram, while noting that the sum of the vertical tire forces must equal the weight of the vehicle, and the sum of the cornering forces at the tires must equal the cornering force, and the sum of the moments around a fore/aft axis must equal zero. Knowing that cornering force does not affect either the front or rear total axle vertical load, and the vertical load and the cornering force of the single rear tire has been determined in the previous step, The total left front axle vertical load can be calculated by summing the moments around the right front tire. Knowing the rear wheel vertical load and the left front axle vertical load and total weight, the right front axle vertical load can be calculated.

Thus, it will be understood that for the three wheeled testing apparatus 1 according to the embodiment of the present invention, a three wheel vehicle allows four of the six forces to be resolved directly from global vehicle performance measurements, including all three vertical tire forces and the cornering force of the singularly positioned tire. In comparison, a four wheel vehicle's vertical and cornering forces cannot be determined from global vehicle performance measurements. Due to its architecture, a three wheeled vehicle has inherent potential to be used as a stable, reliable tire testing apparatus. In addition to its advantages as a tire testing platform, compared to a four wheel vehicle, the three wheel vehicle provides a broader operational range and operational environment that any tire machine conceived to date.

The foregoing description is given for clearness of understanding only, and no unnecessary limitations should be understood therefrom, as modifications within the scope of the invention may be apparent to those having ordinary skill in the art and are encompassed by the claims appended hereto.

I claim:

1. A mobile tire testing apparatus comprising:
   a chassis;
   three wheel-mounted tires respectively attached to the chassis in a triangular arrangement at three corner positions of the mobile tire testing apparatus, wherein two of the wheel-mounted tires are provided at opposite lateral sides at one end portion of the chassis and the third wheel-mounted tire provided centrally in a width direction at the opposite end portion of the chassis;
   a propulsion device operatively connected to drive at least one of the wheel-mounted tires;
   a steering mechanism operatively connected to steer at least two of the wheel-mounted tires;
   a braking system operatively connected to brake each of the three wheel-mounted tires;
   a force and moment sensor provided in operative association with at least the third wheel-mounted tire and configured to detect forces and moments acting on at least the third wheel-mounted tire;
   a data acquisition system for acquiring tire testing data from the force and moment sensor and including a memory, wherein the mobile tire testing apparatus is a stand-alone testing apparatus configured to operate in an unrestrained manner, and the apparatus is configured to simultaneously test tires for longitudinal traction and for cornering characteristics.

2. The mobile tire testing apparatus according to claim 1, further comprising:

a body attached to the chassis and defining an interior space for accommodating one or more passengers;

sensors for detecting dynamic motions of the apparatus, including positions, velocities lateral, longitudinal and vertical acceleration, pitch, roll and yaw rates, tire slip angles and global position;

and at least one controller including a memory, wherein the at least one controller receives outputs from the force and moment sensor and from the sensors for detecting dynamic motions of the apparatus, and is programmed to control operations of the apparatus, wherein the data acquisition system also acquires data from the sensors for detecting dynamic motions of the apparatus.

3. The mobile tire testing apparatus according to claim 2, wherein the sensors for detecting dynamic motions of the apparatus, detect one or more of position, velocity, lateral acceleration, longitudinal acceleration, vertical acceleration, pitch, roll and yaw rate of the apparatus.

4. The mobile tire testing apparatus according to claim 1, further comprising additional sensors which detect at least one of side slip, velocity, acceleration and travel position of at least the third wheel-mounted tire.

5. The mobile tire testing apparatus according to claim 1, wherein the at least one controller includes a transponder configured to receive wireless communications for controlling operations of the mobile tire testing apparatus for testing at least the third wheel-mounted tire.

6. The mobile tire testing apparatus according to claim 1, wherein the at least one controller is configured to receive inputs from a passenger in the apparatus for controlling operations of the mobile tire testing apparatus.

7. The mobile tire testing apparatus according to claim 1, further comprising additional force and moment sensors provided in operative association with the two of the wheel-mounted tires provided at opposite lateral sides at the one end portion of the chassis and configured to detect forces and moments acting on at least said two of the wheel-mounted tires.

8. The mobile tire testing apparatus according to claim 1, wherein the steering mechanism is operatively connected to the two of the wheel-mounted tires provided at opposite lateral sides at the one end portion of the chassis and is configured to permit the tire steering angle sweep on any travelable surface to achieve slip angles of up to 90° for the third wheel-mounted tire.

9. The mobile tire testing apparatus according to claim 1, further comprising axial load cells, position sensors and velocity sensors configured to detect forces acting on the suspensions.

10. The mobile tire testing apparatus according to claim 1, wherein the three wheel-mounted tires respectively attached to the chassis through respective suspensions, and the suspensions are configured to permit camber adjustment and ride height adjustment of the wheel-mounted tires.

11. The mobile tire testing apparatus according to claim 1, wherein the apparatus is configured to also test the tires separately for longitudinal traction and for cornering characteristics.

12. The mobile tire testing apparatus according to claim 1, further comprising a ballast which is configured to be selectively mounted to different parts of the mobile tire testing apparatus.

13. The mobile tire testing apparatus according to claim 12, wherein the ballast is configured to be mount to a bottom of the chassis.

14. The mobile tire testing apparatus according to claim 1, wherein the mobile tire testing apparatus is configured to test the tires on any road or off road surface and under any weather condition.

* * * * *